US006929033B2

(12) United States Patent
Sekiguchi

(10) Patent No.: US 6,929,033 B2
(45) Date of Patent: Aug. 16, 2005

(54) LIQUID DILUTION DEVICE

(75) Inventor: Shinichi Sekiguchi, Kanagawa (JP)

(73) Assignee: Mikuni Corporation, Tokyo (JP)

( * ) Notice: Subject to any disclaimer, the term of this patent is extended or adjusted under 35 U.S.C. 154(b) by 125 days.

(21) Appl. No.: 10/293,601

(22) Filed: Nov. 14, 2002

(65) Prior Publication Data

US 2003/0106598 A1 Jun. 12, 2003

(30) Foreign Application Priority Data

Nov. 26, 2001 (JP) ....................................... 2001-359644

(51) Int. Cl.[7] ................................................ G05D 11/03
(52) U.S. Cl. ................... 137/889; 137/599.12; 137/893
(58) Field of Search ................................. 137/889, 893, 137/599.12

(56) References Cited

U.S. PATENT DOCUMENTS 2,164,153 A * 6/1939 Friedrich ............... 137/599.12
2,953,160 A * 9/1960 Brazier .................. 137/599.12
3,042,077 A * 7/1962 Waddington et al. ....... 137/893
3,191,869 A 6/1965 Gilmour
3,291,395 A 12/1966 Sharp
3,770,205 A 11/1973 Proctor et al.
4,349,157 A 9/1982 Beiswenger et al.
4,475,689 A 10/1984 Hauger et al.
4,779,519 A * 10/1988 Giuliano ..................... 137/889
5,007,588 A 4/1991 Chow et al.

FOREIGN PATENT DOCUMENTS

DE 823967 C 12/1951
JP 3149166 1/2001

* cited by examiner

*Primary Examiner*—Stephen M. Hepperle
(74) *Attorney, Agent, or Firm*—Harness, Dickey & Pierce, P.L.C.

(57) ABSTRACT

A liquid dilution device is provided to prevent choking at a jet for adjusting the flow amount of a special liquid. In the liquid dilution device in which the special liquid from a liquid supply passage 33 of a liquid intake device 29, is introduced to a diluent passage 12 formed in a main body 10 through a jet 22, an air intake opening 37 and a plug 38 to open and close the air intake opening 37 are provided at the liquid intake device 29 to connect the liquid supply passage 33 and atmospheric air. At the state that air from the air intake opening can be introduced to the diluent passage 12 through the jet 22 with the plug 38 opened, high velocity air passes through the jet 22 due to negative pressure generated at the diluent passage 12, by making water pass through the diluent passage 12. Due to the high velocity air, the special liquid stuck to the jet 22 is removed and the jet 22 is cleaned.

6 Claims, 17 Drawing Sheets

LIQUID DILUTION DEVICE

BACKGROUND OF THE INVENTION

1. Field of the Invention

The present invention relates to a liquid dilution device to dilute a special liquid, more particularly relates to a liquid dilution device in which a jet for adjusting a dilution factor can be cleaned.

2. Description of the Related Art

Conventionally, liquid dilution devices are widely used to mix a special liquid such as a chemical liquid or detergent with tap water, for sterilization or disinfection of tableware or fresh vegetables at the time of cleaning. As disclosed in Japanese Patent No.3149166 and so on, for example, the conventional liquid dilution device includes a diluent passage for allowing passage of water (tap water), a negative pressure generating section formed in order to generate negative pressure midway along the diluent passage, and a liquid introduction passage connected at one end to the negative generating section and connected at the other end to a special liquid tank, formed inside a body. By causing a liquid, such as water or the like, to flow in the diluent passage, negative pressure is generated at the negative pressure generating section, so that the special liquid from a special liquid tank is introduced into the diluent passage, and the special liquid is mixed with the water to be diluted.

Since it is desirable for such a liquid dilution device to change the dilution factor depending on the special liquid, various methods for changing the dilution factor have been considered.

For example, it has been considered to fix a jet in a hose connecting the special liquid tank to the liquid dilution device, and to interchange these jets. However, there is a problem that the interchanging of the jets by a user is inferior with regards to efficiency and interchangeability.

Therefore, it has been considered to provide a dilution factor switching means in the liquid dilution device itself. A liquid dilution device of the related art provided with a dilution factor switching means is shown in FIG. 15 and FIG. 16, and the switching means is shown in FIG. 17.

One diluent passage 61 is formed inside the body 60, for introducing a diluent such as water. The diluent passage 61 includes a venturi section 62 formed at some midpoint as a negative pressure generating section, and a diffusion section 63 formed at a downstream side of this venturi section 62 as a negative pressure generating section having a diameter larger than that of the venturi section 62. A connecting passage 64 for connecting the diffusion section 63 to the outer side of the body 60 is formed in the body 60.

A disk 66, which is held between the body 60 and a holding member 65, is provided on the outer side of the body 60 at the side of an opening section of the connecting passage 64, as the dilution factor switching means. The disk 66 is rotatably attached to the body 60 and the holding member 65 through a bearing 68, centering around a shaft (bolt) 67 as a fixing means for fixing the holding member 65 to the body 60. As shown in FIG. 17, a plurality of jets 69, respectively varying in diameter, is formed in the disk 66 on the same radius from a rotation center position.

In addition to the holding member 65, a liquid introduction device 70 is provided on the opposite side to the body 60 so as to sandwich the disk 66, and the liquid introduction device 70 is fixed to the body 60. The liquid introduction device 70 includes a first body 71 and a second body 72, and a liquid supply passage 73 connecting to a special liquid tank, not shown, is formed inside the first body 71 and the second body 72. The liquid supply passage 73 is connected to the dilution passage 61 through the jet 69 formed in the disk 66 and the connecting passage 64 of the body 60.

A ring-shaped seal member 74 is attached at a position of the body 60 facing the disk 66 and surrounding the connecting passage 64. The ring-shaped seal member 74 is for preventing leakage of water from the dilution passage 61 through the connecting passage 64 from a joining surface of the body 60 and disk 66. A ring-shaped seal member 75 is attached at a position of the first body 71 of the liquid introduction device 70 facing the disk 66 and surrounding the liquid supply passage 73. This ring-shaped seal member 75 is for preventing leakage of a special liquid from the liquid supply passage 73 from a joining surface of the first body 71 and disk 66. An elastic member 76 is provided at a position of the body 60 facing the disk 66 and being far from the seal member 74, and an elastic member 77 is provided at a position of the holding member 65 facing the disk 66 and being far from the seal member 75. These elastic members 76 and 77 prevent the disk 66 from leaning towards either the body 60 or the holding member 65.

The connecting passage 64 of the body 60 and the liquid supply passage 73 of the liquid introduction device 70 are connected through the jet 69 by lining up one of the plurality of jets 69 formed in the disk 66. In this way, when the connecting passage 64 and the liquid supply passage 73 are connected through the jet 69, the special liquid is introduced from the liquid supply passage 73 into the dilution passage 61 by negative pressure generated in a diffusion section 63 of the dilution passage 61. Here, it is possible to vary the flow amount of the special liquid introduced into the dilution passage 61 to change the dilution factor, by rotating the disk 66 to line up one of the plurality of jets 69 with the connecting passage 64 and the liquid supply passage 73.

With the liquid dilution device which comprises only one jet 69 to adjust the flow amount, or comprises the plurality of jets 69 to adjust the flow amount in the dilution factor switching means 66, with the passage of certain time after the jet 69 is once used, there arises a problem that the desired dilution factor cannot be obtained because the special liquid may be dried out, the jet 69 may be stuck, and the jet 69 may be choked.

The present invention was devised in the light of the abovementioned problem. It is an object of the present invention to provide a liquid dilution device which makes it possible to prevent a jet for adjusting the flow amount of the special liquid from choking.

SUMMARY OF THE INVENTION

A liquid dilution device of the present invention in which a jet is cleaned by utilizing air, comprises a main body, a diluent passage formed in the main body, a negative pressure generating section formed in midstream of the diluent passage, a connecting passage formed in the main body and connected to the negative pressure generating section, a liquid supply passage which supplies special liquid to the diluent passage through the connecting passage, a jet which connects the connecting passage and the liquid supply passage, an air intake opening through which the liquid supply passage side of the jet connects to atmospheric air, and an open-close means which opens and closes the air intake opening, and in this liquid dilution device, negative pressure is generated at the negative pressure generating section by making liquid flow in the diluent passage with the open-close means opened, so that air is introduced from the air intake opening to the diluent passage through the jet and the connecting passage.

The liquid dilution device of the present invention in which a jet is cleaned by utilizing air, can further comprise a cylindrical dial which is free to pivot and disposed outside the main body, and a plurality of the jets disposed on a particular circumference of the dial. Moreover, the liquid dilution device can further comprise a liquid intake device in which the liquid supply passage is formed, and which is disposed outside the main body, and in this liquid dilution device, the air intake opening, which connects the liquid supply passage and atmospheric air, and the open-close means are disposed at the liquid intake device.

Furthermore, the liquid dilution device can further comprise, a cylindrical dial which is free to pivot and is disposed outside the main body, a plurality of the jets disposed on a particular circumference of the dial, an outer body which covers the jet and is disposed outside the dial, an outer connecting passage which connects to all the jets, and which is formed at the position facing the dial and the outer body, an inner connecting passage which connects to all the jets, and which is formed at the position facing the dial and the main body, and in this liquid dilution device, the air intake opening is formed at the outer body, one end of the air intake opening is connected to the outer connecting passage, and negative pressure is generated at the negative pressure generating section by making liquid flow in the diluent passage with the open-close means opened, so that air is introduced from the air intake opening to the diluent passage through the outer connecting passage, all the jets, the inner connecting passage, and the connecting passage.

The liquid dilution device of the present invention in which a jet is cleaned by utilizing a liquid such as water, comprises a main body, a diluent passage formed in the main body, a negative pressure generating section formed in midstream of the diluent passage, a connecting passage formed in the main body and connected to the negative pressure generating section, a liquid supply passage which supplies special liquid to the diluent passage through the connecting passage, a jet which connects the connecting passage and the liquid supply passage, a circulating passage through which the downstream side from the position of the negative pressure generating section of the diluent passage connects to the liquid supply passage side of the jet, and a switching means which comprises the jet and performs connection or disconnection between the circulating passage and the jet, and in this liquid dilution device, negative pressure is generated at the negative pressure generating section by making liquid flow in the diluent passage, with the circulating passage and the connecting passage are connected through the jet, so that the liquid flowing at the downstream side from the position of the negative pressure generating section of the diluent passage is introduced to the diluent passage through the circulating passage and the jet.

Additionally, in the liquid dilution device of the present invention in which a jet is cleaned by utilizing a liquid such as water, the switching means is a dial which is free to pivot and is disposed outside the main body, a plurality of jets is disposed on a particular circumference of the dial, an outer body which covers the jet is disposed outside the dial, an outer connecting passage which connects to all the jets is disposed at the position facing the dial and the outer body, an inner connecting passage which connects to all the jets is disposed at the position facing the dial and the main body, and a communicating passage, which always communicates with either the outer connecting passage or the circulating passage, and depending on the rotating position of the dial, communicates with either the circulating passage or the outer connecting passage, is disposed so as to connect the outer connecting passage and the circulating passage.

Moreover, in the liquid dilution device, the switching means is a dial which is free to pivot and is disposed outside the main body, a plurality of jets is disposed on a particular circumference of the dial, an outer body which covers the jet is disposed outside the dial, same number of the circulating passages as that of jets are formed in the outer body, and each of the jet connects to each of the circulating passage respectively, with the dial being at a specific rotating position.

By causing tap water to pass through the diluent passage, negative pressure is generated at the venturi section in the diluent passage, and the negative pressure reaches the liquid supply passage and the air intake opening through the jet. Due to the negative pressure which reaches the air intake opening, outer atmospheric air is introduced into the liquid supply passage and introduced into the diluent passage through the jet and the connecting passage. The air which is introduced from the air intake opening to the diluent passage flows fast at the position of the jet which cross-sectional area is small, and the air is introduced to the diluent passage removing a special liquid which sticks to the jet or its vicinity by the high velocity air. As a result, choking with the special liquid at the jet can be prevented.

By performing such cleaning for each of the jet after using it, the occurrence of choking at the jet can be prevented.

DESCRIPTION OF THE PREFFERED EMBODIMENT

The first embodiment of the present invention will now be described based on the drawings.

Figure 1:
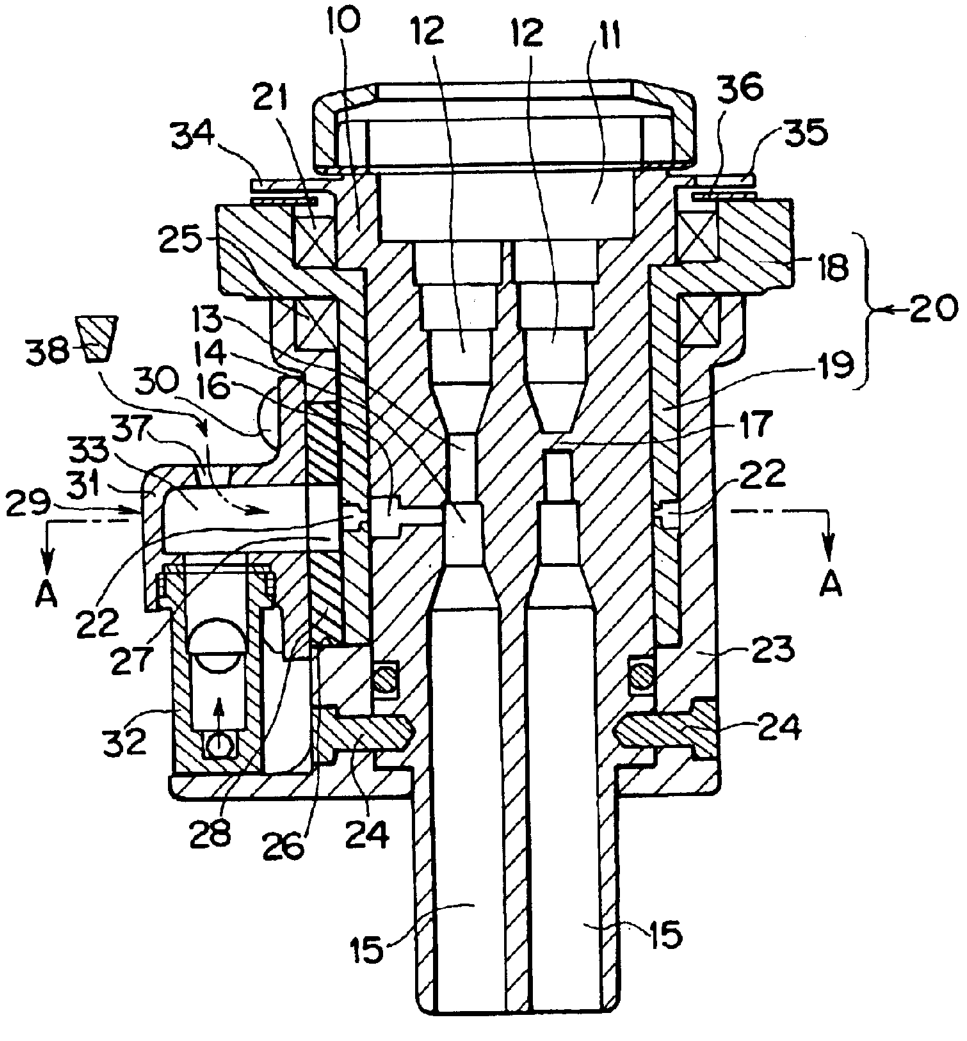
FIG. 1 is a cross-sectional view showing the first embodiment of a liquid dilution device of the present invention.
Figure 2:
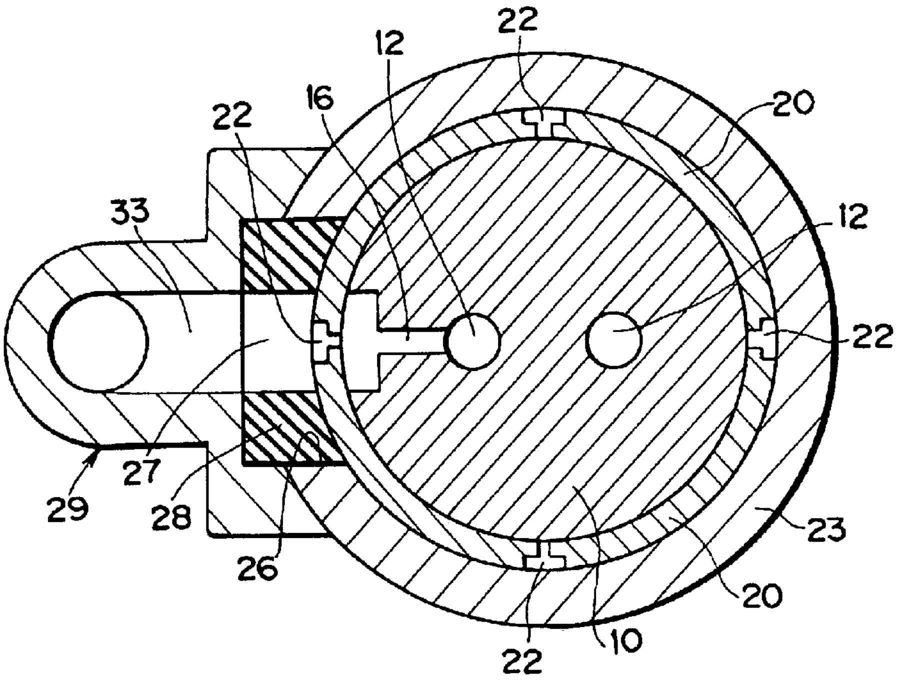
FIG. 2 is a cross-sectional view of A—A in FIG. 1.
Figure 3:
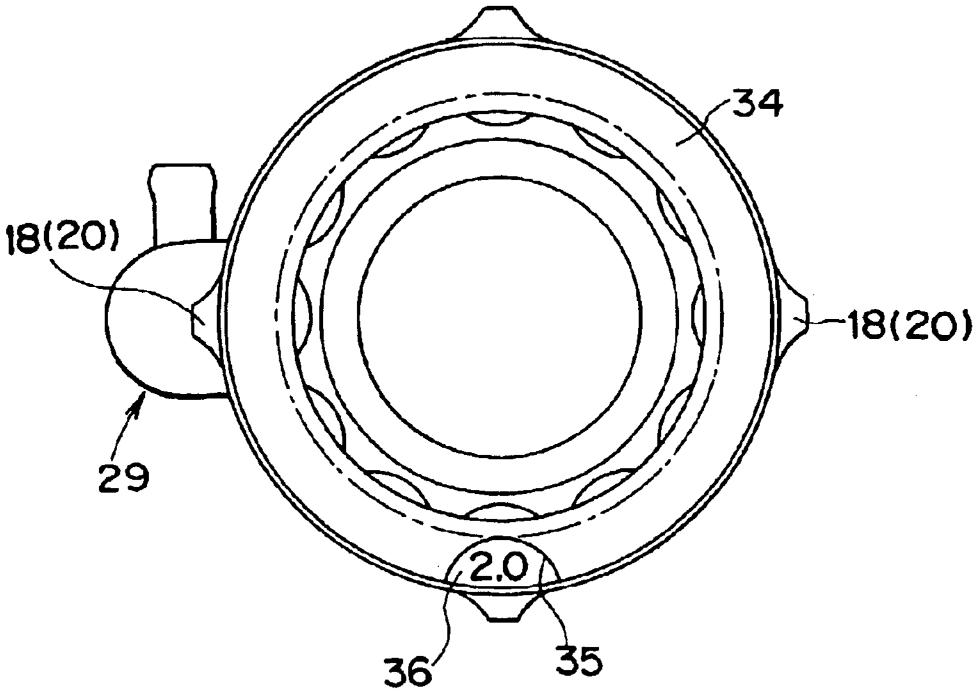
FIG. 3 is a plain view of FIG. 1.

FIG. 1 is a cross-sectional view of the first embodiment of a liquid dilution device of the present invention. FIG. 2 is a cross-sectional view of A—A in FIG. 1, and FIG. 3 is a plain view of FIG. 1. A diluent main passage 11 is formed inside a main body 10 to introduce a liquid, such as water, i.e. a diluent. The diluent main passage 11 branches into a plurality of diluent passages 12 in midstream. In one diluent passage 12 among the plurality of diluent passages 12, a venturi section 13 as a negative pressure generating section having the smallest cross-sectional area, a diffusion section 14, as a negative pressure generating section having a larger diameter than the venturi section 13 at a downstream side (with the diluent main passage 11 side being an upstream side) of the venturi section 13, and a discharge passage section 15 having a larger diameter than the diffusion section 14 are formed from upstream towards downstream sequentially. A connecting passage 16 for connecting the diffusion section 14 and the outer side of the main body 10 are formed in the main body 10.

Although a plurality of diluent passages 12 is formed in the main body 10 in FIG. 1 and FIG. 2, the diluent passage 12 can also be formed alone. In case a plurality of diluent passages 12 is formed, a separating wall 17 can be formed to close the diluent passage 12 at a midway of diluent passage 12 to which the connecting passage 16 is not connected directly. The separating wall 17 being easy to break, the number of the dilution passages 12 are increased by breaking the separating wall 17, so that the flow amount of the diluent and the dilution factor are increased.

A cylindrical dial (a switching means) 20 having a large diameter section 18 and a small diameter section 19 is rotatably provided to the outer side of the main body 10. A central axis for rotation of the dial 20 is set so as to be parallel to a flow of water or the like in the diluent main passage 11 and the diluent passage 12. An oil seal 21 is provided between an outer wall surface of the main body 10 and an inner wall surface of the large diameter section 18 of the cylindrical dial 20. There is a contact between an inner wall surface of the small diameter section 19 of the cylindrical dial 20 and the outer wall surface of the main body 10, and the small diameter section 19 covers the connecting passage 16 of the main body 10. A plurality of the jets 22 connecting from the inside to the outside of the small diameter section 19 is formed on a particular circumference of the small diameter section 19 of the dial 20 where the connecting passage 16 faces. The plurality of jets 22 is set so as to vary in diameter respectively.

A cylindrical outer body 23 is fixed to the main body 10 by a fixing means 24 so as to cover the small diameter section 19 of the dial 20. An oil seal 25 is provided between an upper inner wall of the cylindrical outer body 23 and an upper outer wall of the small diameter section 19 of the dial 20. At the state that the main body 10 and the outer body 23 are fixed together, the large diameter section 18 of the dial 20 is exposed to the outer side of the main body 10 and the outer body 23, and the dial 20 is free to pivot to the main body 10 and the outer body 23 by turning the large diameter section 18 of the dial 20. A hole 26 is formed in the cylindrical outer body 23, at the position facing the connecting passage 16 of the main body 10, and a cylindrical seal member 28 having a connecting hole 27 in its center is installed in the hole 26.

A liquid intake device 29 is fixed to the outer body 23 by a fixing means 30 so as to cover the seal member 28. The liquid intake device 29 comprises the first body 31 and the second body 32, and a liquid supply passage 33 which connects to the special liquid tank (not shown) is formed in these bodies. In the state that the first body 31 is fixed to the outer body 23 by a fixing means 30, one end of the liquid supply passage 33 of the liquid intake device 29 connects to the connecting hole 27 and faces to the connecting passage 16 of the main body 10 through the dial 20.

Here, by rotating the dial 20 so that the jet 22 of the dial 20 is lined up with the connecting passage 16 of the main body 10 and the connecting hole 27 of the seal member 28, the liquid supply passage 33 connects to the diluent passage 12 through the connecting hole 27, the jet 22 and the connecting passage 16. To the contrary, in case a position of the dial 20 other than the jet 22 faces the connecting passage 16 of the main body 10 and the connecting hole 27 of the outer body 23, the connection between the connecting passage 16 of the main body 10 and the connecting hole 27 of the outer body 23 is shut off by the wall of the dial 20.

In the state that the liquid supply passage 33 of the liquid intake device 29 is connected to the diluent passage 12 of the main body 10 through the jet 22, and when the diluent flows in the diluent passage 12, negative pressure is generated at the negative pressure generating section of the diluent passage 12, the negative pressure reaches the liquid supply passage 33, and a special liquid from the liquid supply passage 33 is introduced to the diluent passage 12 through the jet 22 and so on. The flow amount of the special liquid can be adjusted by choosing an appropriate jet 22.

As shown in FIG. 1 and FIG. 3, a ring-shaped brim 34 protruding outer side is formed integrally at the upper end of the main body 10. A notch 34 is formed partly on the ring-shaped brim 34. A ring-shaped indicating plate 36 is fixed to the upper surface of the large diameter section 18 of the dial 20. The indicating plate 36 is set to be seen through the notch 35 of the brim 34. As the dial 20 is rotated, the indicating plate 36 at the position of the notch 35 indicates which jet 22, out of a plurality of the jets 22 formed in the dial 20, is lined up with the connecting passage 16 (connects to the diluent passage 12). As shown in FIG. 3, when the indicating plate 36 seen through the notch 35 indicates "2.0", for example, it shows that the jet 22 which diameter is 2.0 mm connects the connecting passage 16 of the main body 10 and the liquid supply passage 33 of the liquid intake device 29.

As shown in FIG. 1, an air intake opening 37 is formed at the upper portion of the first body 31 of the liquid intake device 29 to connect the liquid supply passage 33 and atmospheric air, and a plug 38 is attached to the air intake opening 37 as an open-close means. The plug 38 usually closes the air intake opening 37, and at the cleaning process of the jet 22 of the dial 20, it opens the air intake opening 37 so that atmospheric air is introduced into the liquid supply passage 33. Here, the air intake opening 37 formed in the first body 31 is preferably located at the position near the connecting passage 16 of the main body 10 and upper side.

With the present invention having the above described structure, the dial 20 is rotated to select a jet 22 which has a diameter that matches a desired dilution factor out of a few jets 22 respectively varying in diameter, and the selected jet 22 is lined up with the connecting passage 16 of the main body 10 and the liquid supply passage 33 of the liquid intake device 29. When tap water, for example, is introduced into the diluent main passage 11, the tap water is discharged from a discharge passage section 15 through the diluent passage 12. In this case, the negative pressure generated at the diluent passage 12 reaches the liquid supply passage 33 of the liquid intake device 29, and the special liquid is introduced from the liquid supply passage 33 to the diluent passage 12 through the connecting hole 27 and the jet 22 so as to be mixed with the tap water in the diluent passage 12. Here, it is possible to change the dilution factor of the special liquid by rotating the dial 20 to change the jet 22.

In case the jet 22 has not been used for considerable time after a chemical liquid, detergent or the like is introduced to the diluent passage 12, the special liquid may stick to the jet 22 causing the dilution factor change or causing choking at the jet 22. To remove the stuck special liquid from the jet 22, the jet through which the special liquid passed is to be lined up with the connecting passage 16 and the liquid supply passage 33, at first. Furthermore, the plug 38 which is attached to the air intake opening 37 of the first body 31 is to be removed. This procedure enables atmospheric air to be introduced into the liquid supply passage 33 through the air intake opening 37. With this state, a liquid such as tap water is lead to pass through the diluent passage 12.

By causing tap water to pass through the diluent passage 12, negative pressure is generated at the venturi section in the diluent passage 12, and the negative pressure reaches the liquid supply passage 33 and the air intake opening 37 through the jet 22. Due to the negative pressure which reaches the air intake opening 37, outer atmospheric air is introduced into the liquid supply passage 33 and introduced to the diluent passage 12 through the jet 22 and the connecting passage 16. The air which is introduced to the diluent passage 12 flows fast at the position of the jet 22 which cross-sectional area is small, and the air is introduced to the diluent passage 12 removing a special liquid which sticks to the jet or its vicinity by the high velocity air. As a result, choking with the special liquid at the jet 22 can be prevented.

By performing such cleaning for each of the jet 22 after using it, the occurrence of choking at the jet can be prevented. After finishing the cleaning of the jet 22, the supply of tap water to the diluent passage 12 is stopped and the air intake opening 37 of the first body 31 is closed with the plug 38.

Next, the second embodiment of the present invention will be described based on the drawings.

Figure 4:
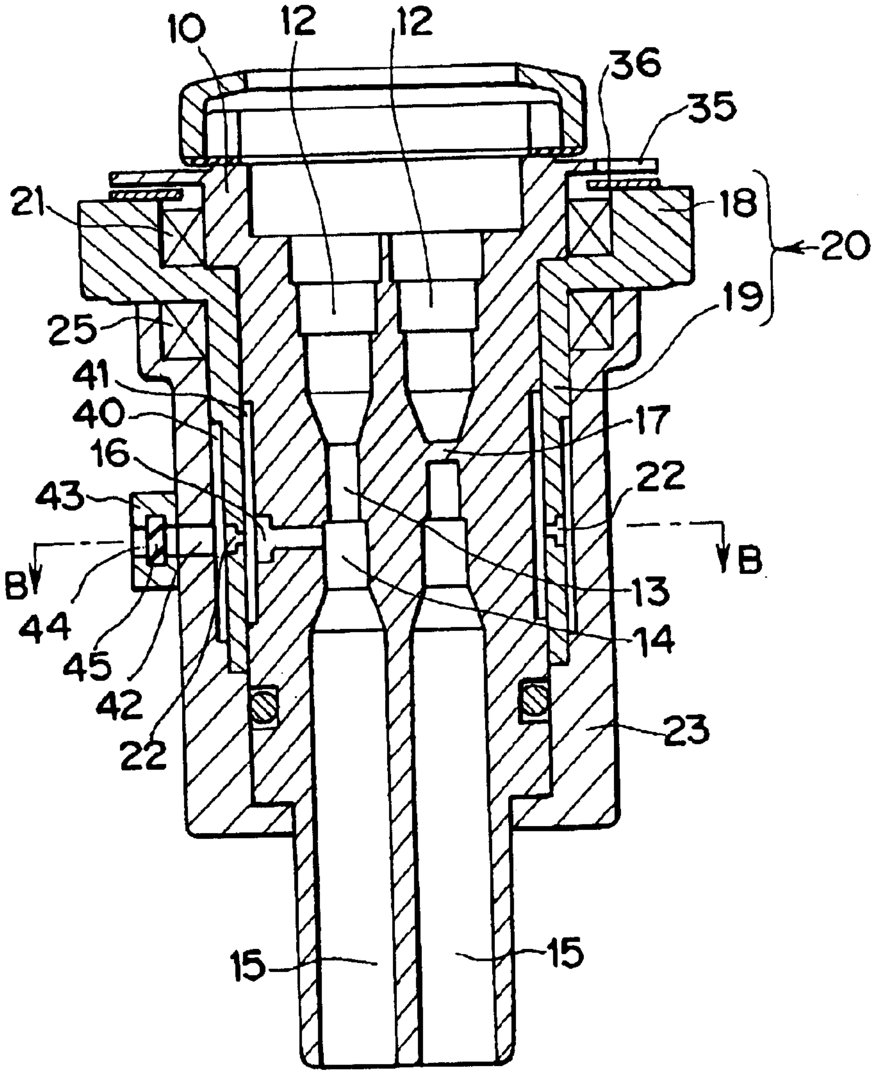
FIG. 4 is a cross-sectional view showing the second embodiment of a liquid dilution device of the present invention.
Figure 5:
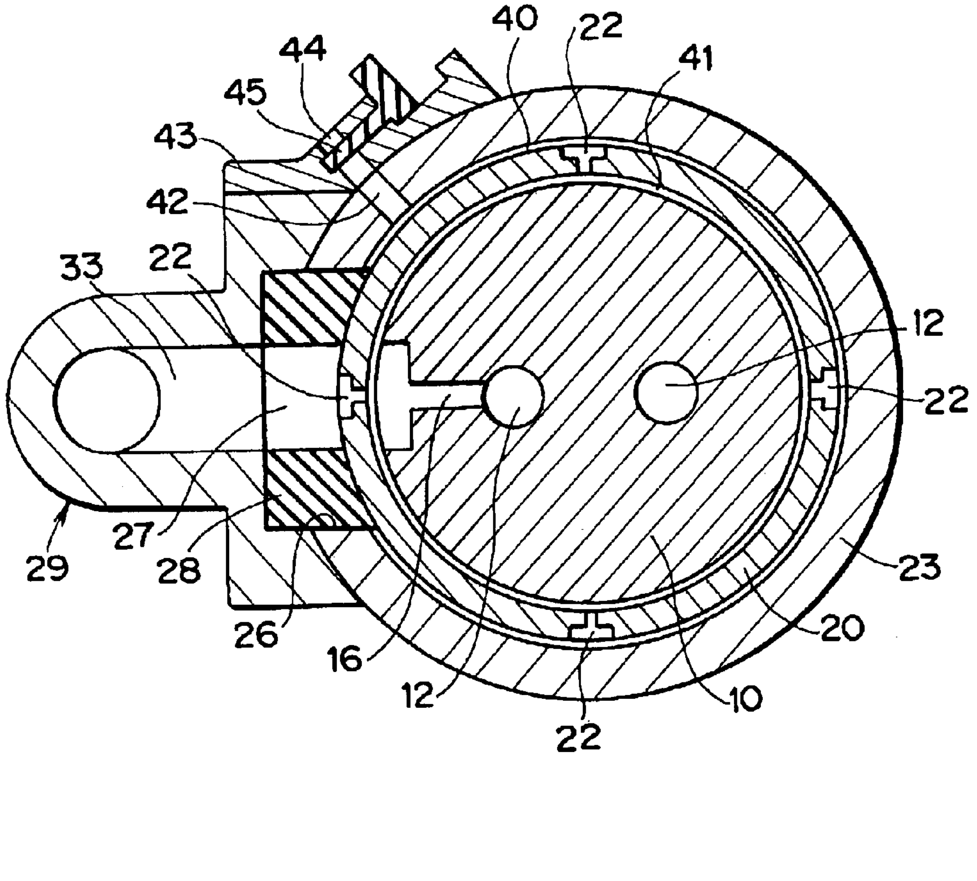
FIG. 5 is a cross-sectional view of B—B in FIG. 4.

FIG. 4 is a cross-sectional view showing the second embodiment of a liquid dilution device of the present invention, and FIG. 5 is a cross-sectional view of B—B in FIG. 4. In the second embodiment, the same reference numerals denote the same portions as those in the first embodiment. In the second embodiment, being same as the first embodiment, choking at the jet 22 is prevented by utilizing atmospheric air. Being different from the first embodiment, the second embodiment adopts a structure in which air is directly introduced to the outer side of the jet 22 of the dial 20 from an air intake opening (described later) which is formed at the outer body 23, in which air is not introduced to the liquid supply passage 33 of the liquid intake device 29, and a structure which enables to perform cleaning all the jets 22 formed at the dial 20 for preventing choking.

As shown in FIG. 4 and FIG. 5, a cylindrical outer connecting passage 40 which connects to all the jets 22 is formed at the facing position between an inner wall of an outer body 23 and an outer wall of the cylindrical dial 20. Although it is preferable to form the cylindrical outer connecting passage 40 on the outer wall of the dial 20, it is also possible to form it on the inner wall of the outer body 23. A cylindrical inner connecting passage 41 which connects to all the jets 22 is formed at the facing position between an inner wall of the dial 20 and an outer wall of the main body 10. Although it is preferable to form the cylindrical inner connecting passage 41 on the outer wall of the main body 10, it is also possible to form it on the inner wall of the dial 20. In this way, the outer connecting passage 40 of the outer side of the dial 20 and the inner connecting passage 41 of the inner side of the dial 20 are connected through all the jets 22. The inner connecting passage 41 is connected to the diluent passage 12 through the connecting passage 16 which is formed in the main body 10.

In the second embodiment being similar to the first embodiment, a plurality of the jets 22 connecting from the inside to the outside of the small diameter section 19 is formed on a particular circumference of the dial 20, where the connecting passage 16 of the main body 10 faces. Further, as shown in FIG. 5, when the liquid intake device 29 is fixed to the outer body 23, a cylindrical seal member 28 is put into contact with the outer wall of the dial 20. The cylindrical seal member 28 disconnects the direct connection between the outer connecting passage 40 and the connecting hole 27 of the seal member 28 (the liquid supply passage 33 of the liquid intake device 29).

An air intake opening 42, connected at one end to the outer connecting passage 40 and connected at the other end to the outside, is formed in the outer body 23. A plug mounting member 44 in which an air intake opening 43 is formed, is fixed to the liquid intake device 29 or the outer body 23, so as to close the air intake opening 42. In the state that the plug mounting member 44 is fixed to the liquid intake device 29 or the outer body 23, one end of the air intake opening 43 connects to the air intake opening 42 formed in the outer body 23, and the other end of the air intake opening 43 communicates to atmospheric air. In this way, the outer connecting passage 40 is capable to connect to atmospheric air through the air intake openings 42, 43. A plug 45 is mounted to the plug mounting member 44 as an open-close means, and the outer connecting passage 40 and atmospheric air are connected or disconnected through the air intake opening 42, 43, in accordance with the opening and closing of the plug 45.

As shown in FIG. 5, to introduce the special liquid to the diluent passage 12, the air intake opening 43 is closed with the plug 45 of the plug mounting member 44 so as not to introduce atmospheric air to the outer connecting passage 40. After that, the jet 22 of an appropriate size is to be lined up to the liquid supply passage 33 of the liquid intake device 29 and the connecting passage 16 of the main body 10, by rotating the dial 20. In this state, negative pressure generated at the negative pressure generating section of the diluent passage 12 reaches the liquid supply passage 33 of the liquid intake device 29, and the special liquid from the liquid supply passage 33 is introduced to the diluent passage 12 through the jet 22. The state of a plain view of FIG. 5, being same as the state of FIG. 3, the indicating plate 36 indicates through the notch 35 which jet 22 out of a plurality of the jets 22 is being used.

In case a special liquid such as a chemical liquid, detergent or the like is introduced to the diluent passage 12, the special liquid sticks to the jet 22. To remove the stuck special liquid from the jet 22, the dial 20 is to be rotated from the position shown in FIG. 3 to the position shown in FIG. 6 (45 degrees rotation in this example) at first. When the dial 20 is rotated to the position of FIG. 6, the sign of “cleaning” appears on the indicating plate 36 which can be seen through the notch 35. Next, the air intake opening 43 is opened by moving the plug 45 mounted to the plug mounting member 44, from the state of FIG. 5.

Figure 6:
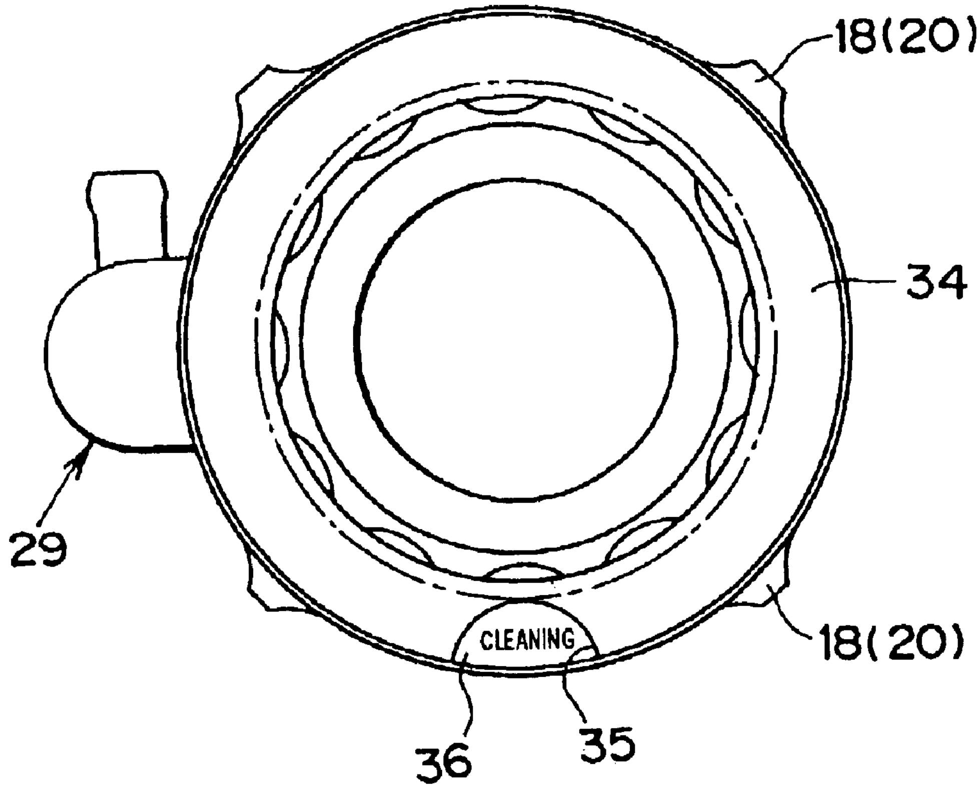
FIG. 6 is a plain view of FIG. 4, at the cleaning process of the jets.
Figure 7:
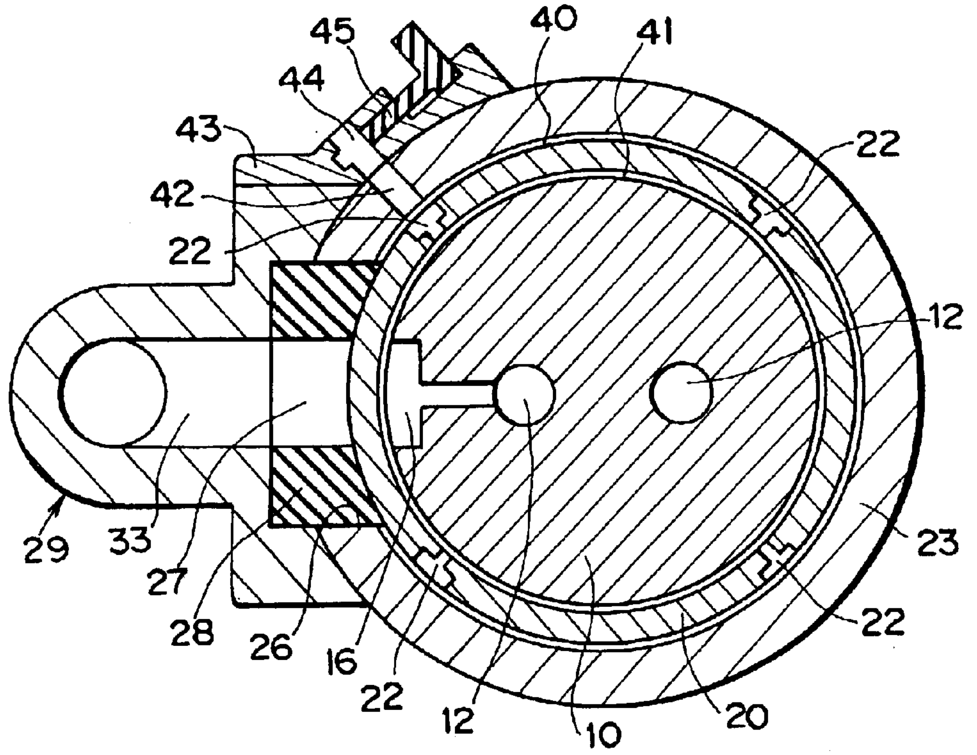
FIG. 7 is a corresponding view to FIG. 5, at the cleaning process of the jets.

FIG. 7 is a cross-sectional view corresponding to FIG. 5, showing the state that the dial 20 is rotated to the state of FIG. 6 and the plug 45 mounted to the plug mounting member 44 is moved so as to open the air intake opening 43. In the state of FIG. 7, the liquid supply passage 33 of the liquid intake device 29 and the connecting passage 16 of the main body 10 are disconnected by the dial 20, and the special liquid from the liquid supply passage 33 is not introduced to the diluent passage 12. Further, because the air intake opening 43 is opened, it is possible in this state to introduce atmospheric air to the outer connecting passage 40 through the air intake openings 43, 42.

In the state of FIG. 7, when a liquid such as tap water flows in the diluent passage 12, negative pressure is generated at a venturi section in the diluent passage 12, and the negative pressure reaches the air intake opening 42, 43, through the connecting passage 16, the inner connecting passage 41, all the jet 22 and the outer connecting passage 40. Consequently, atmospheric air is introduced from the air intake openings 43, 42 to the diluent passage 12 through the outer connecting passage 40, each of the jet 22, the inner connecting passage 41, and the connecting passage 16. At the position of the jet 22, the flow velocity of the air is increased as the cross-sectional area is degreased, and the high velocity air passes through all the jet 22. As a result, the cleaning of the jet 22, through which the special liquid passes and to which the special liquid is stuck, is performed as well as the cleaning of the jet 22 which is not used (through which the special liquid does not pass). In this way, choking at the jet 22 with the special liquid is efficiently prevented, because all the jets 22 are to be cleaned with air at the cleaning process.

After finishing the cleaning of the jet 22, the supply of tap water to the diluent passage 12 is stopped, the air intake opening 43 is closed by moving the plug 45 mounted to the plug mounting member 44, and the dial 20 is turned from the position shown in FIG. 6 to the position shown in FIG. 3. By this operation, the state in which the special liquid can be diluted is obtained again.

Further, the third embodiment of the present invention will be described based on the drawings.

Figure 8:
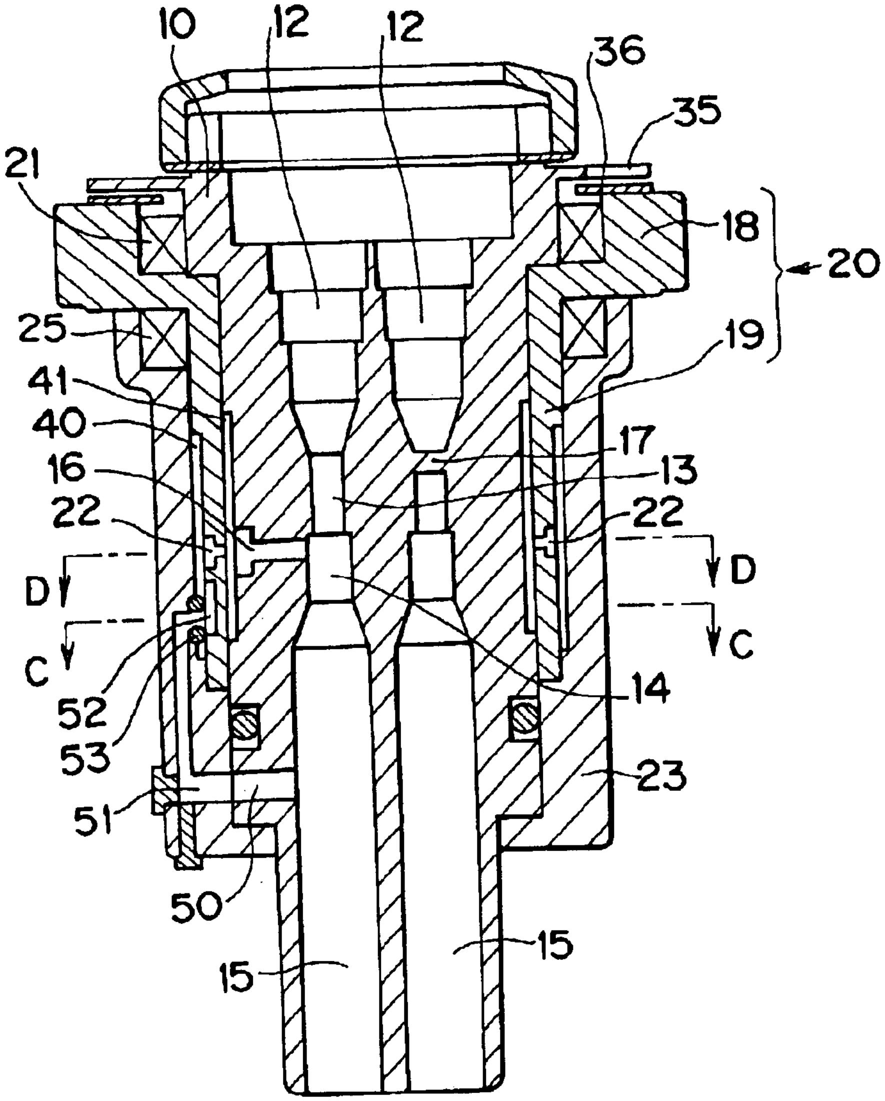
FIG. 8 is a cross-sectional view showing the third embodiment of a liquid dilution device of the present invention.
Figure 9:
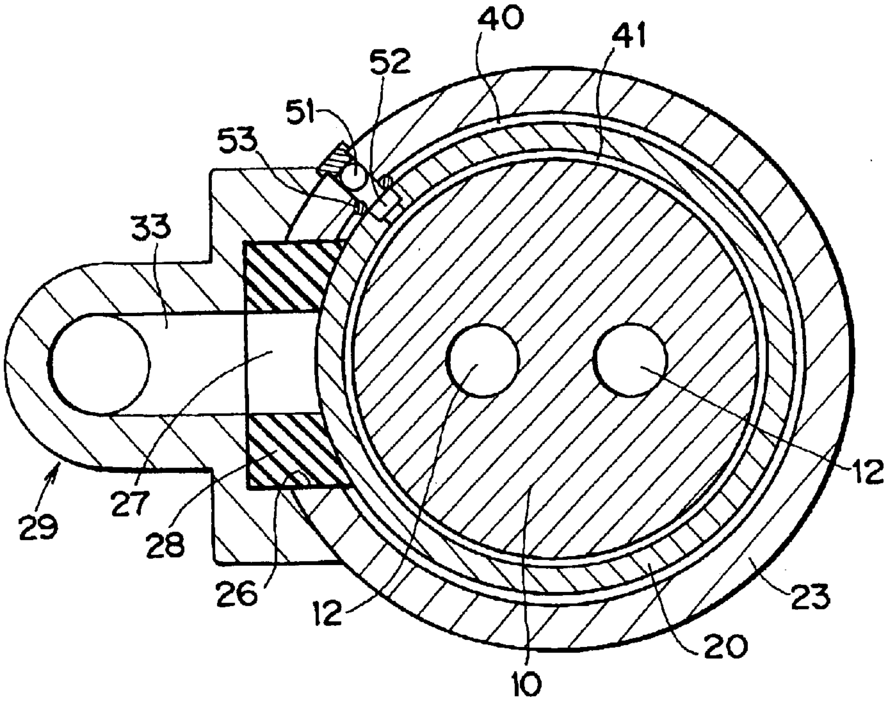
FIG. 9 is a cross-sectional view of C—C in FIG. 8.
Figure 10:
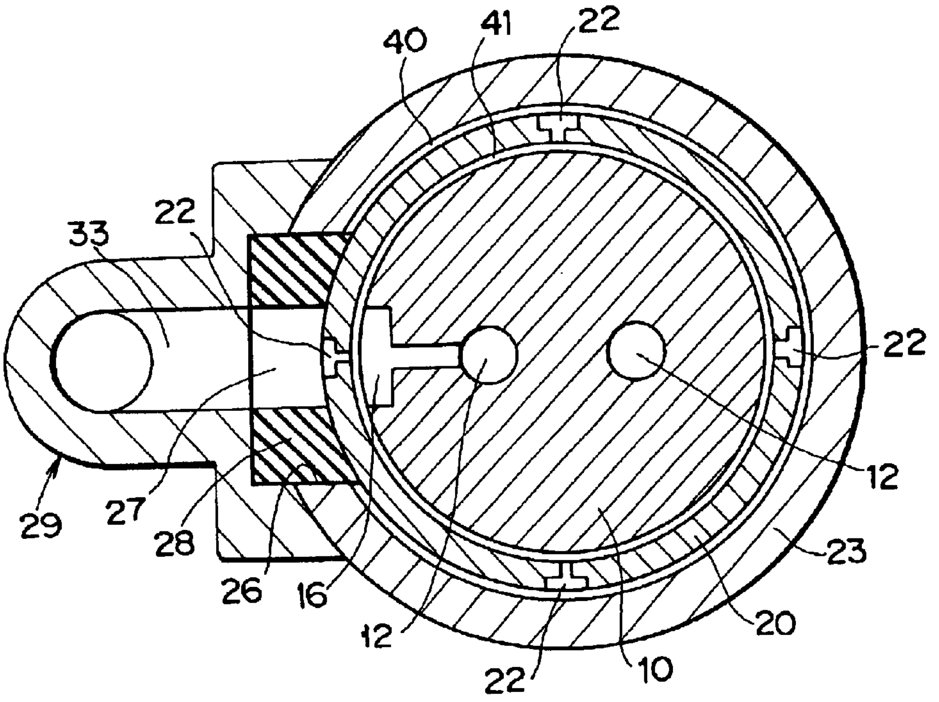
FIG. 10 is a cross-sectional view of D—D in FIG. 8.

FIG. 8 is a cross-sectional view showing the third embodiment of a liquid dilution device of the present invention. FIG. 9 is a cross-sectional view of C—C in FIG. 8, and FIG. 10 is a cross-sectional view of D—D in FIG. 8. In the third embodiment, the same reference numerals denote the same portions as those in the first and second embodiments. While the choking at the jet 22 is prevented by utilizing air in the first and second embodiments, the choking at the jet 22 is prevented utilizing a liquid such as water flowing through the diluent passage 12 in the third embodiment.

In the third embodiment, being similar to the first and second embodiments, a plurality of jets 22 connecting from the inside to the outside of the small diameter section 19 is formed on a particular circumference of the dial 20, facing the connecting passage 16 of the main body 10. Further, in the third embodiment, being similar to the second embodiment, a cylindrical outer connecting passage 40 which connects to all the jets 22 is formed at the facing position between an inner wall of an outer body 23 and an outer wall of the cylindrical dial 20, and a cylindrical inner connecting passage 41 which connects to all the jets 22 is formed at the facing position between an inner wall of the dial 20 and an outer wall of the main body 10.

As shown in FIG. 8 and FIG. 9, a first circulating passage 50 is formed in the main body 10, which communicates with a midway of a discharge passage section 15 which is located at the downstream side of the diluent passage 12. In the cylindrical outer body 23 which is fixed to the outside of the main body 10, a second circulating passage 51 is formed, which one end connects to the first circulating passage 50, and the other end is open at the position facing the outer wall of the dial 20. On the outer surface of the dial 20, a communicating passage 52 is formed, which one end always communicates with the outer connecting passage 40, and the other end is capable to connect to the second circulating passage 51. As shown in FIG. 8 and FIG. 9, the communicating passage 52 is formed on the outer surface of the dial 20, being parallel to the axis direction and being short in length. Further, the communicating passage 52 can be formed at a plurality of positions on the outer surface of the dial 20. The communicating passage 52 is set to communicate with the second circulating passage (the state of FIG. 8 and FIG. 9), only in case when the dial 20 is rotated to a specific position (the state of FIG. 6). An O-ring 53 is mounted to the inner wall of the outer body 23 at the position of the opening of the second circulating passage 51 facing the dial 20, so as to have a contact with the outer wall of the dial 20. The O-ring 53 is for shutting of the connection between the second circulating passage 51 and the outer connecting passage 40. Besides, it is also possible to set the communicating passage 52 to communicate always with the second circulating passage 51 and to communicate with the outer connecting passage 40 when the dial 20 is at a specific rotating position. In this case, the communicating passage 52 is formed on the inner surface of the outer body 23.

In case that the special liquid is to be introduced to the diluent passage 12, the dial 20 is rotated so as to line up the jet 22 of appropriate size of the dial 20 with the liquid supply passage 33 of the liquid intake device 29 and the connecting passage 16 of the main body 10, as shown in FIG. 10. In this way, negative pressure generated at the diluent passage 12 reaches the liquid supply passage 33 of the liquid intake device 29, and the special liquid is introduced from the liquid supply passage 33 to the diluent passage 12 through the jet 22 and the connecting passage 16.

In the state of FIG. 10, the communicating passage 52 formed in the dial 20 (in FIG. 9) is rotated to the position where it does not communicate with the opening portion of the dial 20 side of the second circulating passage 51. That is, the opening portion of the dial 20 side of the second circulating passage 51 is closed with the outer wall of the dial 20. The plain view of the state of FIG. 10 being same as that of FIG. 3, the indicating plate 36 indicates through the notch 35 which jet 22 out of a plurality of jets 22 is being used.

To remove the stuck special liquid from the jet 22 after finishing the use of the special liquid, such as a chemical liquid, detergent or the like, the dial 20 is to be rotated from the position shown in FIG. 3 to the position shown in FIG. 6. When the dial 20 is rotated to the position of FIG. 6, the sign of "cleaning" appears on the indicating plate 36 which can be seen through the notch 35. Rotating to the position where "cleaning" is indicated on the indicating plate 36, the communicating passage 52 of the dial 20 is set to communicate with the second circulating passage 51, as shown in FIG. 9. In the state of FIG. 9, the liquid supply passage 33 of the liquid intake device 29 and the connecting passage 16 of the main body 10 are disconnected by the dial 20, as shown in FIG. 11.

Figure 11:
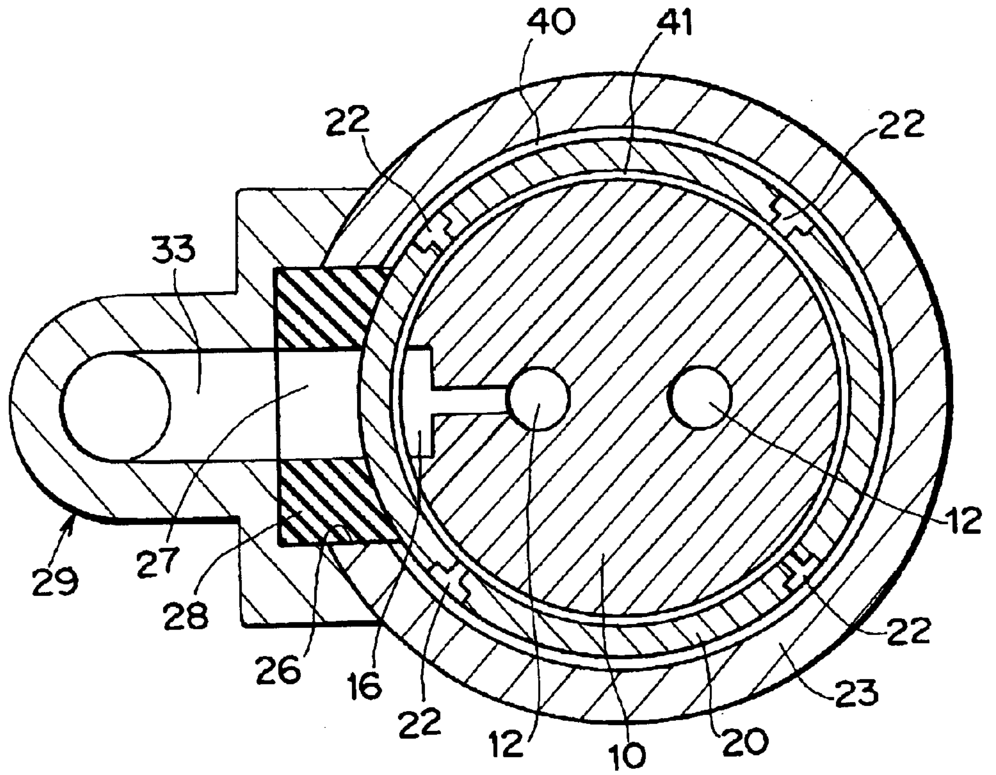
FIG. 11 is a corresponding view to FIG. 10, at the cleaning process of the jets.

In the state of FIG. 11 (the state of FIG. 8 and FIG. 9), when a liquid such as water flows in the diluent passage 12, negative pressure is generated at the negative pressure generating section in the diluent passage 12, and the negative pressure reaches the discharge passage section 15 which connects to the first circulating passage 50, through the connecting passage 16, the inner connecting passage 41, the jet 22, the outer connecting passage 40, the communicating passage 52, the second circulating passage 51 and the first circulating passage 50. Due to the negative pressure, water which flows in the discharge passage section 15 is introduced to the venturi section of the diluent passage 12, through the first circulating passage 50, the second circulating passage 51, the communicating passage 52, the outer connecting passage 40, all the jets 22, the inner connecting passage 41 and the connecting passage 16. That is, the circulating water from the discharge passage section 15 to the diluent passage 12 through the first circulating passage 50 and the second circulating passage 51 passes through all the jets 22 which locate on the midstream. At the position of the jet 22, which cross-sectional area is small, the velocity of the water is increased and the special liquid stuck to the jet 22 is cleaned out with the high velocity water. As a result, the special liquid does not remain at the jet 22, and choking with the special liquid at the jet 22 is prevented. In this way, choking at the jet 22 with the special liquid is efficiently prevented, because all the jets 22, including the jets which are not used, are to be cleaned with water at the cleaning process.

Furthermore, the forth embodiment of the present invention will be described based on the drawings.

Figure 12:
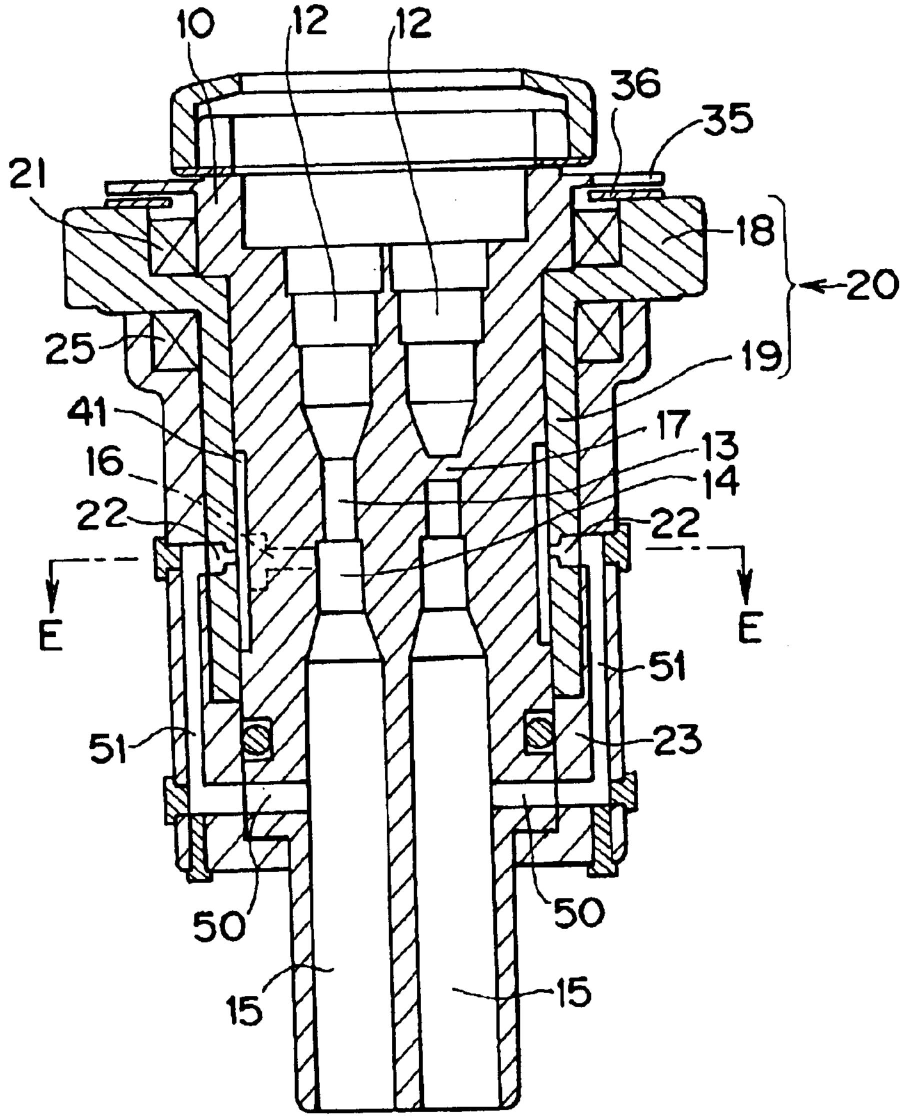
FIG. 12 is a cross-sectional view showing the forth embodiment of a liquid dilution device of the present invention.
Figure 13:
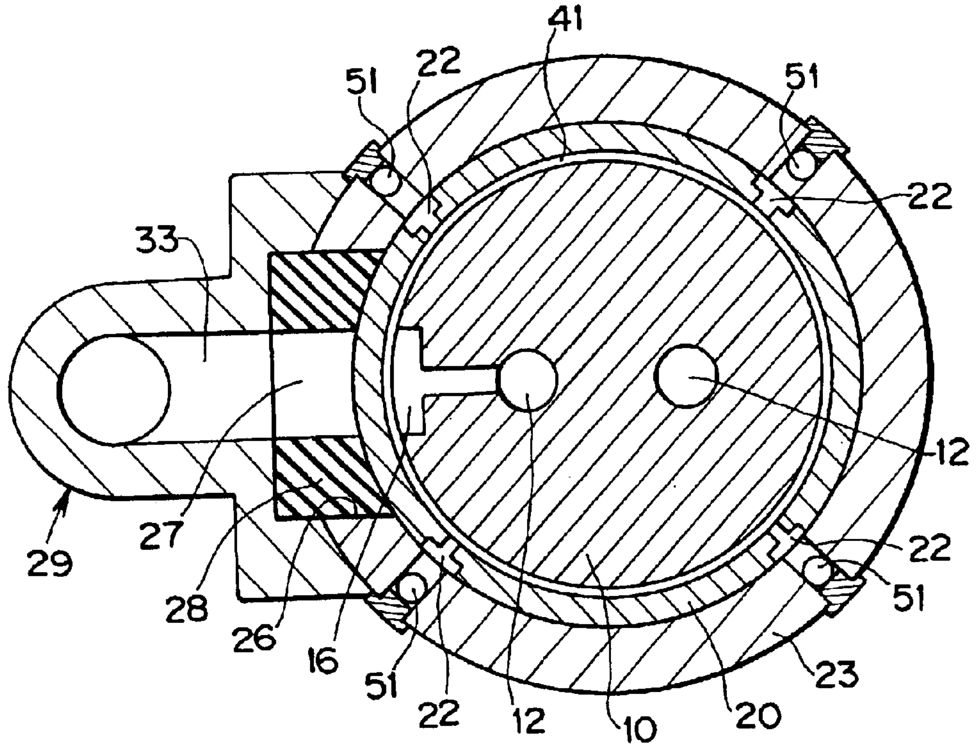
FIG. 13 is a cross-sectional view of E—E in FIG. 12.

FIG. 12 is a cross-sectional view showing the forth embodiment of a liquid dilution device of the present invention, and FIG. 13 is a cross-sectional view of E—E in FIG. 12. In the forth embodiment, the same reference numerals denote the same portions as those in the third embodiment. In the forth embodiment being similar to the third embodiment, choking at the jet 22 is prevented by utilizing a liquid such as water flowing in the diluent passage 12.

In the forth embodiment, a plurality of jets 22 is formed on a particular circumference of the dial 20, being same as the above-described embodiments. However, in the forth embodiment, the opening of the second circulating passage 51 is set so as to be capable to face directly to the jet 22, eliminating the outer connecting passage 40, the communicating passage 52 and the O-ring 53 formed in the third embodiment.

As shown in FIG. 12 and FIG. 13, the first circulating passages 50, which connect to the discharge passage section 15 of the diluent passage 12, are formed in the main body 10 as the same number of the jets 22. Further, the second circulating passages 51, with one end being connected to the first circulating passage 50 and the other end being opened to the outer wall of the dial 20, are formed in the outer body 23 as the same number of the jets 22. The opening positions of the second circulating passage 51 of the outer body 23 are on a particular circumference facing the plurality of jets 22.

Figure 14:
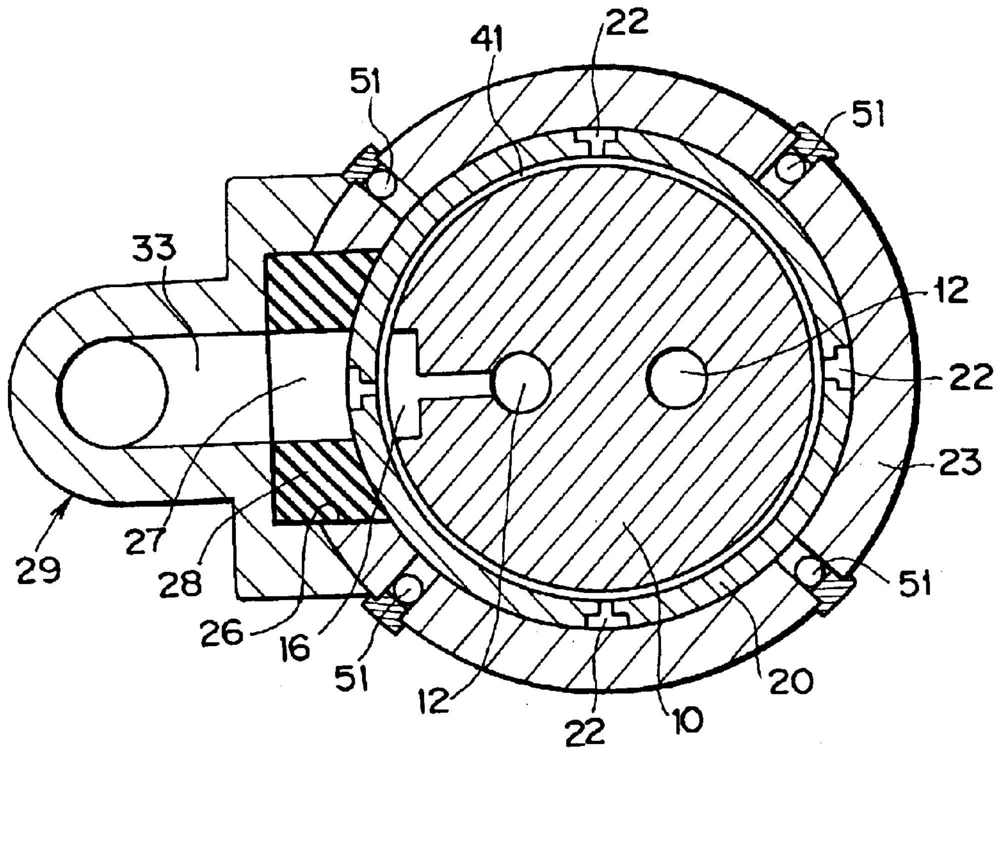
FIG. 14 is a corresponding view to FIG. 13, at the introducing process of the special liquid.
Figure 15:
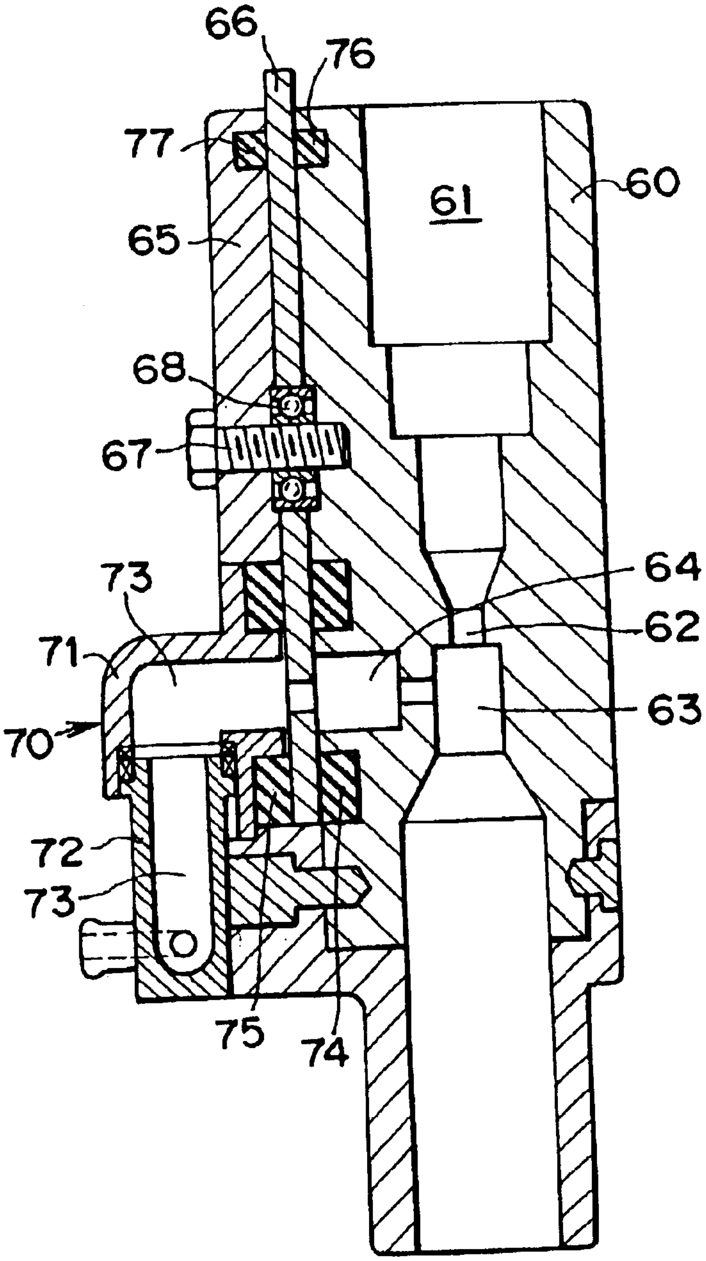
FIG. 15 is a cross-sectional view of a liquid dilution device of the related art.
Figure 16:
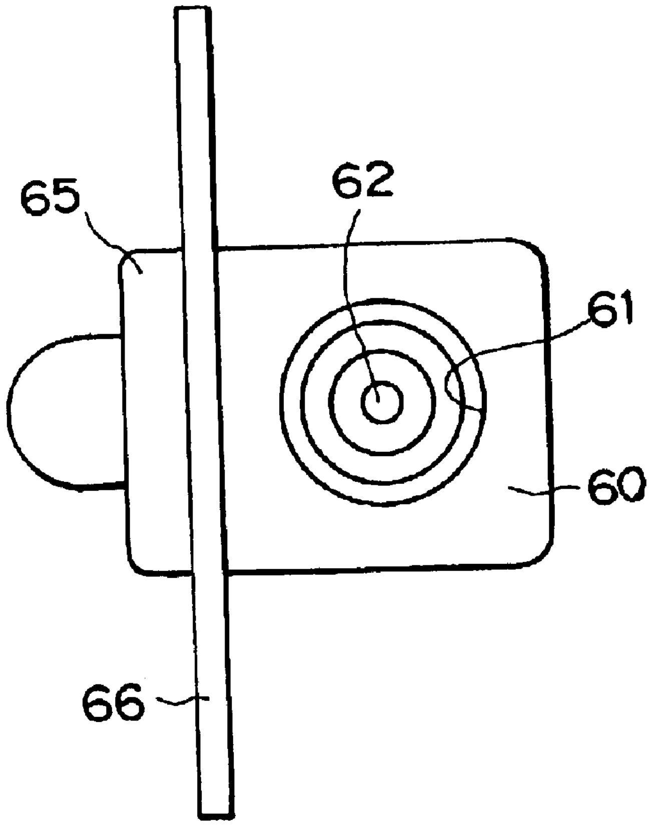
FIG. 16 is a plain view of the liquid dilution device shown in FIG. 15.
Figure 17:
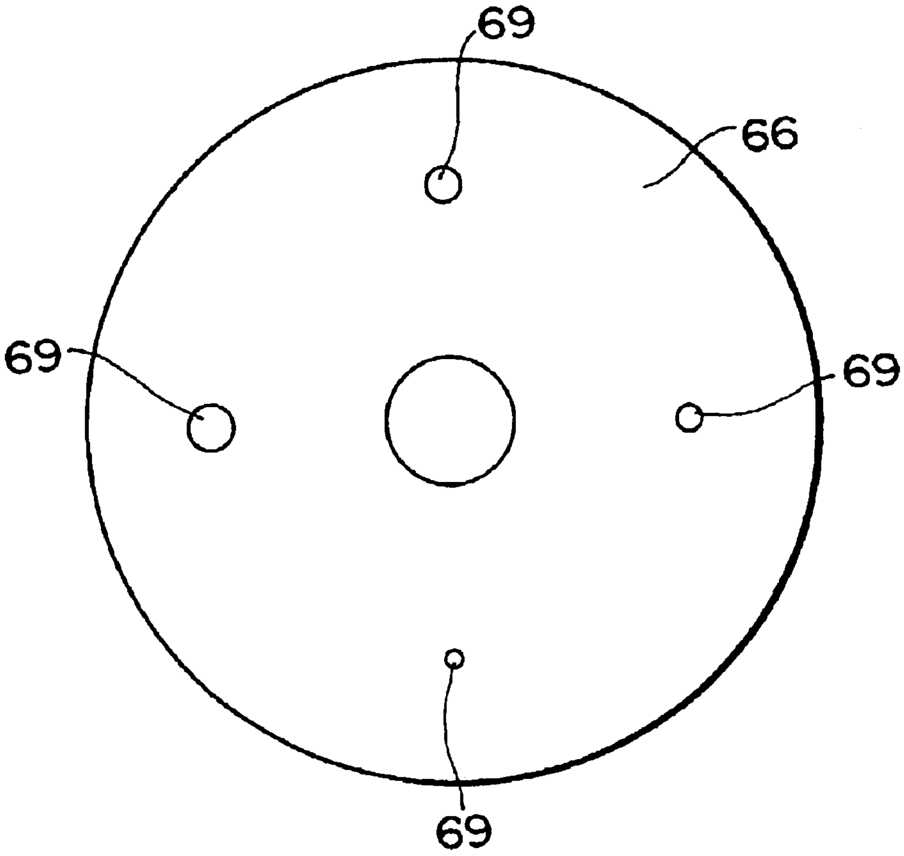
FIG. 17 is a front view of the dilution factor switching means used in the liquid dilution device of the related art.

In case that the special liquid is to be introduced to the diluent passage 12, the dial 20 is rotated so as to line up the jet 22 of appropriate size with the liquid supply passage 33 of the liquid intake device 29 and the connecting passage 16 of the main body 10, as shown in FIG. 14. In this way, negative pressure generated at the diluent passage 12 reaches the liquid supply passage 33 of the liquid intake device 29, and the special liquid is introduced from the liquid supply passage 33 to the diluent passage 12 through the jet 22. In the state of FIG. 14, the opening portion of the dial 20 side of the second circulating passage 51 is closed with the outer wall of the dial 20, and the second circulating passage 51 does not connect to the jet 22. The plain view of the state of FIG. 14 being same as that of FIG. 3, the indicating plate 36 indicates through the notch 35 which jet 22 out of a plurality of jets 22 is being used.

To remove the stuck special liquid from the jet 22 after finishing the use of the special liquid, such as a chemical liquid, detergent or the like, the dial 20 is to be rotated from the position shown in FIG. 3 to the position shown in FIG. 6. When the dial 20 is rotated to the position of FIG. 6, the sign of "cleaning" appears on the indicating plate 36 through the notch 35. At the position where "cleaning" is indicated on the indicating plate 36 which can be seen through the notch 35, the state of FIG. 12 and FIG. 13 is obtained, in which the jet 22 of the dial 20 connects to the second circulating passage 51. In this state, the liquid supply passage 33 of the liquid intake device 29 and the connecting passage 16 of the main body 10 are disconnected by the dial 20.

In the state of FIG. 12 and FIG. 13, when a liquid such as water flows in the diluent passage 12, negative pressure is generated at the venturi section in the diluent passage 12, and the negative pressure reaches the discharge passage section 15 at the position which connects to the first circulating passage 50, through the connecting passage 16, the inner connecting passage 41, the jet 22, the second circulating passage 51 and the first circulating passage 50. Due to the negative pressure, water flowing in the discharge passage section 15 is introduced to the venturi section of the diluent passage 12, through each of the first circulating passage 50, each of the second circulating passage 51, each of the jet 22, the inner connecting passage 41 and the connecting passage 16. That is, the circulating water to the diluent passage 12 through each of the first circulating passage 50 and each of the second circulating passage 51 passes through each of the jet 22 which locates on the midstream. At the position of the jet 22, which cross-sectional area is small, the velocity of the water is increased and the special liquid stuck to the jet 22 is cleaned out with the high velocity water. As a result, all the jets 22 can be cleaned at the cleaning process, and choking with the special liquid at the jet 22 can be prevented.

In the forth embodiment, although the same number of the first circulating passages 50 and the second circulating passages 51 as that of jets 22 of the dial 20 are formed to perform cleaning of all the jets 22 at the same time, it is also possible to have one jet 22, one first circulating passage 50 and one second circulating passage 51, eliminating the inner connecting passage 41.

As described above, with the liquid dilution device of the present invention, at the cleaning process of the jet after introducing the special liquid, air or water is introduced to the diluent passage through the jet by making negative pressure at the diluent passage reach the discharge passage section of air or water through the jet. As a result, high velocity air or water passes through the jet, the special liquid stuck to the jet is cleaned out with this air or water, and choking at the jet with the special liquid is prevented.

What is claimed is:

1. A liquid dilution device, comprising:

a main body;

a diluent passage formed in said main body;

a negative pressure generating section formed in midstream of said diluent passage;

a connecting passage formed in said main body and connected to said negative pressure generating section;

a liquid supply passage which supplies special liquid to said diluent passage through said connecting passage;

a jet which connects said connecting passage and said liquid supply passage;

an air intake opening through which the liquid supply passage side of said jet connects to atmospheric air;

an open-close which opens and closes said air intake opening;

a cylindrical dial which is free to pivot and disposed outside said main body; and a plurality of the jets disposed on particular circumference of said dial, wherein negative pressure is generated at said negative pressure generating section by making liquid flow in said diluent passage, with said open-close means opened, so that air is introduced from said air intake opening to said diluent passage through said jet and said connecting passage.

2. The liquid dilution device according to claim 1, further comprising a liquid intake device in which said liquid supply passage is formed, and which is disposed outside said main body, wherein said air intake opening, which connects said liquid supply passage and atmospheric air, and said open-close means are disposed at said liquid intake device.

3. The liquid dilution device according to claim 1, further comprising:

a cylindrical dial which is free to pivot and is disposed outside said main body;

a plurality of the jets disposed on a particular circumference of said dial;

an outer body which covers said jet and is disposed outside said dial;

an outer connecting passage which connects to all said jets, and which is formed at the position facing said dial and said outer body;

an inner connecting passage which connects to all said jets, and which is formed at the position facing said dial and said main body;

wherein said air intake opening is formed at said outer body;

one end of said air intake opening is connected to said outer connecting passage; and negative pressure is generated at said negative pressure generating section by making liquid flow in said diluent passage, with said open-close means opened, so that air is introduced from said air intake opening to said diluent passage through said outer connecting passage, all said jets, said inner connecting passage, and said connecting passage.

4. A liquid dilution device, comprising:

a main body;

a diluent passage formed in said main body;

a negative pressure generating section formed in midstream of said diluent passage;

a connecting passage formed in said main body and connected to said negative pressure generating section;

a liquid supply passage which supplies special liquid to said diluent passage through said connecting passage;

a jet which connects said connecting passage and said liquid supply passage;

a circulating passage through which the downstream side from the position of the negative pressure generating section of said diluent passage connects to the liquid supply passage side of said jet; and a switching means which comprises said jet and performs connection or disconnection between said circulating passage and said jet;

wherein negative pressure is generated at said negative pressure generating section by making liquid flow in said diluent passage, with said circulating passage and said connecting passage are connected through said jet, so that the liquid flowing at the downstream side from the position of the negative pressure generating section of said diluent passage is introduced to said diluent passage through said circulating passage and said jet.

5. The liquid dilution device according to claim 4, wherein said switching means is a dial which is free to pivot and is disposed outside said main body;

a plurality of jets is disposed on a particular circumference of said dial;

an outer body which covers said jet is disposed outside said dial;

an outer connecting passage which connects to all said jets is disposed at the position facing said dial and said outer body;

an inner connecting passage which connects to all said jets is disposed at the position facing said dial and said main body; and a communicating passage which always communicates with either said outer connecting passage or said circulating passage, and depending on the rotating position of the dial, communicates with either said circulating passage or said outer connecting passage, is disposed so as to connect said outer connecting passage and said circulating passage.

6. The liquid dilution device according to claim 4, wherein said switching means is a dial which is free to pivot and is disposed outside said main body;

a plurality of jets is disposed on a particular circumference of said dial;

an outer body which covers said jet is disposed outside said dial;

same number of said circulating passages as that of jets are formed in said outer body; and each of said jet connects to each of said circulating passage respectively, with said dial being at a specific rotating position.

* * * * *